United States Patent
Bosshard et al.

(10) Patent No.: US 11,522,605 B2
(45) Date of Patent: Dec. 6, 2022

(54) METHOD FOR MULTIBEAM COVERAGE BY THE GROUPING OF ELEMENTARY BEAMS OF DIFFERENT COLOURS, AND TELECOMMUNICATIONS PAYLOAD FOR IMPLEMENTING SUCH A METHOD

(71) Applicant: THALES, Courbevoie (FR)

(72) Inventors: Pierre Bosshard, Toulouse (FR); Didier Le Boulc'h, Toulouse (FR)

(73) Assignee: THALES, Courbevoie (FR)

( * ) Notice: Subject to any disclaimer, the term of this patent is extended or adjusted under 35 U.S.C. 154(b) by 219 days.

(21) Appl. No.: 16/226,514

(22) Filed: Dec. 19, 2018

(65) Prior Publication Data

US 2019/0199432 A1 Jun. 27, 2019

(30) Foreign Application Priority Data

Dec. 21, 2017 (FR) .................................... 1701344

(51) Int. Cl.
*H04B 7/204* (2006.01)
*H04B 7/185* (2006.01)
*H04W 72/04* (2009.01)
*H04B 17/336* (2015.01)
(Continued)

(52) U.S. Cl.
CPC ....... *H04B 7/2041* (2013.01); *H04B 7/18513* (2013.01); *H04B 7/18515* (2013.01); *H04W 72/046* (2013.01); *H01Q 21/24* (2013.01); *H04B 7/043* (2013.01); *H04B 17/336* (2015.01); *H04W 72/0453* (2013.01)

(58) Field of Classification Search
CPC .............. H04B 7/1851; H04B 7/18513; H04B 7/18515; H01Q 25/007; H01Q 19/17; H01Q 19/175
See application file for complete search history.

(56) References Cited

U.S. PATENT DOCUMENTS 3,541,553 A * 11/1970 Gubin .................. H04B 7/2041
 342/353
6,018,316 A * 1/2000 Rudish ................... H01Q 1/288
 342/361
(Continued)

FOREIGN PATENT DOCUMENTS

DE 100 21 112 A1 11/2001
DE 10021112 A1 * 11/2001 ............. H01B 7/204
FR 3058578 A1 * 5/2018 ........... H01Q 25/007

OTHER PUBLICATIONS

Machine Translation DE 10021112A1 (Year: 2001).*

*Primary Examiner* — Gregory C. Issing
(74) *Attorney, Agent, or Firm* — BakerHostetler

(57) ABSTRACT

A method for multibeam coverage of a region of the surface of the Earth includes the generation, by a telecommunications payload embedded on a satellite, of a plurality of radiofrequency beams, called elementary beams; the formation of a plurality of radiofrequency beams, called composite beams, exhibiting footprints on the ground of different sizes, each the composite beam being obtained by the grouping of one or more elementary beams; and the transmission or the reception of data through the composite beams, identical data being transmitted or received through all the elementary beams forming one and the same composite beam.

8 Claims, 3 Drawing Sheets

(51) Int. Cl.
*H01Q 21/24* (2006.01)
*H04B 7/0426* (2017.01)

(56) References Cited

U.S. PATENT DOCUMENTS

| | | | | |
|---|---|---|---|---|
| 6,434,384 | B1* | 8/2002 | Norin | H04B 7/18523 |
| | | | | 343/772 |
| 6,441,785 | B1* | 8/2002 | Rosen | H01Q 3/26 |
| | | | | 342/158 |
| 6,813,492 | B1* | 11/2004 | Hammill | H04B 7/2041 |
| | | | | 455/12.1 |
| 7,706,787 | B2* | 4/2010 | Malarky | H04B 7/18515 |
| | | | | 455/429 |
| 7,768,956 | B2* | 8/2010 | Fenech | B64G 1/1007 |
| | | | | 370/316 |
| 9,306,293 | B2 | 4/2016 | Bosshard et al. | |
| 9,306,295 | B2 | 4/2016 | Bosshard et al. | |
| 9,705,586 | B2* | 7/2017 | Wang | H04B 7/2041 |
| 9,848,370 | B1* | 12/2017 | Freedman | H04B 7/18515 |
| 2002/0039883 | A1* | 4/2002 | Zaghloul | H04B 7/18528 |
| | | | | 455/13.3 |
| 2014/0022138 | A1* | 1/2014 | Bosshard | H01Q 21/064 |
| | | | | 343/836 |
| 2014/0112241 | A1 | 4/2014 | Gayrard et al. | |
| 2017/0181160 | A1 | 6/2017 | Corbel et al. | |
| 2017/0289822 | A1 | 10/2017 | Hreha et al. | |
| 2019/0199432 | A1* | 6/2019 | Bosshard | H01Q 21/24 |
| 2019/0199433 | A1* | 6/2019 | Bosshard | H04B 7/2041 |

\* cited by examiner

METHOD FOR MULTIBEAM COVERAGE BY THE GROUPING OF ELEMENTARY BEAMS OF DIFFERENT COLOURS, AND TELECOMMUNICATIONS PAYLOAD FOR IMPLEMENTING SUCH A METHOD

CROSS-REFERENCE TO RELATED APPLICATIONS

This application claims priority to foreign French patent application No. FR 1701344, filed on Dec. 21, 2017, the disclosure of which is incorporated by reference in its entirety.

FIELD OF THE INVENTION

The invention relates to the field of satellite telecommunications. More particularly, it relates to a method for producing a multibeam coverage of a region of the surface of the Earth, and to a telecommunications payload, intended to be embedded on a satellite, making it possible to implement such a method.

BACKGROUND

The search for high transmission capacities in the satellite communications systems dictates the use of antennas with beams for producing so-called "multibeam" coverages of a region of interest of the surface of the Earth. Such coverage takes the form of a juxtapositioning of geographically distinct individual coverages, contiguous or not contiguous, generally of circular or elliptical form and corresponding to the footprints on the ground of different beams generated by a telecommunications satellite. It should be noted that the term "beam" can cover two distinct realities: when considering a downlink, this effectively concerns beams of electromagnetic radiation being propagated from the satellite to the ground; in the case of an uplink, on the other hand, "beam" denotes a lobe of the reception pattern of the antenna system of the satellite.

The multibeam coverages generally allow for the re-use of the frequency according to a so-called "N-colour" scheme. According to such a scheme, in order to avoid interferences, two adjacent beams have a different "colour", each "colour" corresponding to a pairing of frequency and polarization state.

The disparity in data traffic means between different parts of the region of interest can be very significant; it is therefore necessary to vary the size of the beams serving these different parts. Thus, it is common practice to use fine beams of minimal angular aperture in the zones with high user density, and wide beams of large angular aperture in the zones with low user density. As an example, FIG. 1 shows a multibeam coverage of Australia having very wide beams in the unpopulated zones from the centre to the north and very much finer beams in the coastal regions of the south west and of the south east.

In a satellite adapted to produce a multibeam coverage, the beams are generally generated by antenna systems comprising feed antennas (or simply "feeds"; they are generally horns or sets of horns) and reflectors. Typically, each feed antenna generates a respective beam, while one and the same reflector can contribute to the generation of several distinct beams. The size of a beam depends both on the characteristics of the feed antenna and on those of the reflector; furthermore, a reflector is optimized for a feed having certain characteristics. In practice, different feeds can generate beams of slightly different size using one and the same reflector, but the mismatch between feed and reflector rapidly becomes problematic. Consequently, to be able to generate a multibeam coverage comprising beams of very different sizes (ratio between the surface areas of the footprints on the ground being able to reach, even exceed, a factor of 4) it is necessary to use several different reflectors. That leads to complex and costly antenna systems.

Moreover, the beams of large dimensions exhibit transmission pattern slopes that are a lot less steep than the more directional beams; in other words, their intensity decreases more progressively on moving away from the centre of the beam. Consequently, the "tails" of the beams of large size tend to interfere with the smaller beams.

SUMMARY OF THE INVENTION

The invention aims to remedy, wholly or partly, at least one of the abovementioned drawbacks of the prior art. More particularly, the invention aims to allow for the production of a multibeam coverage by means of an antenna system that is simpler and more readily industrialized, and/or to minimize the interferences between beams. Some embodiments of the invention also make it possible to obtain a greater flexibility in the definition of the beams.

One subject of the invention that makes it possible to achieve these aims is therefore a method for multibeam coverage of a region of the surface of the Earth comprising:

the generation, by a telecommunications payload embedded on a satellite, of a plurality of radiofrequency beams, called elementary beams;

the formation of a plurality of radiofrequency beams, called composite beams, exhibiting footprints on the ground of different sizes, each said composite beam being obtained by the grouping of one or more elementary beams; and the transmission or the reception of data through said composite beams, identical data being transmitted or received through all the elementary beams forming one and the same composite beam;

wherein at least one said composite beam is formed by the grouping of a plurality of elementary beams of different colours, a colour being defined by a frequency band and a polarization state.

Advantageously, at least one said composite beam is formed by the grouping of a plurality of elementary beams having one and the same frequency band and two mutually orthogonal polarization states.

Advantageously, at least one said composite beam is formed by the grouping of a plurality of elementary beams whose footprints on the ground are adjacent.

Advantageously, a plurality of said elementary beams exhibit footprints on the ground of substantially identical size.

Advantageously, all said elementary beams exhibit footprints on the ground of substantially identical size.

Advantageously, the footprints on the ground of said composite beams have sizes which vary progressively across said region of the surface of the Earth.

Advantageously, all the elementary beams forming one and the same composite beam are generated at the same time.

As a variant, all the elementary beams forming one and the same composite beam are generated in turn.

The invention relates also to a satellite telecommunications payload for the implementation of a method as predefined, and comprising:

a plurality of feed antennas;

at least one reflector arranged to cooperate with said feed antennas so as to generate a radiofrequency beam, called elementary beam, for each said feed antenna; and a plurality of transmission or reception modules configured to transmit or receive respective data in the form of radiofrequency signals;

each said feed antenna belongs to a grouping of feed antennas, at least some of said groupings comprising a plurality of feed antennas;

each said transmission module is linked to all the feed antennas belonging to one and the same grouping, such that the elementary beams generated by the feed antennas of one and the same grouping form a composite beam; and the elementary antennas of at least one said grouping are configured to generate elementary beams of different colours, a colour being defined by a frequency band and a polarization state;

said groupings of feed antennas being configured such that a plurality of said composite beams exhibit footprints on the ground of different sizes.

Advantageously, the elementary antennas of at least one said grouping are configured to generate elementary beams having one and the same frequency band and two mutually orthogonal polarization states.

Advantageously, the elementary antennas of at least one said grouping are configured to generate elementary beams whose footprints on the ground are adjacent.

Advantageously, said groupings of feed antennas are configured such that a plurality of said elementary beams exhibit footprints on the ground of substantially identical size.

Advantageously, said groupings of feed antennas are configured such that all said elementary beams exhibit footprints on the ground of substantially identical size.

Advantageously, at least one said transmission or reception module is equipped with a switch configured to link said module to the corresponding elementary antennas in turn.

BRIEF DESCRIPTION OF THE DRAWINGS

Other features, details and advantages of the invention will emerge on reading the description given with reference to the attached drawings given by way of example and which represent, respectively.

DETAILED DESCRIPTION

The principle on which the invention is based consists in covering the region of interest with fine beams of identical size—or at the very most having a small number (for example 2 or 3) of different sizes—which can be combined with one another, particularly in the less dense traffic zones, to generate wider "composite" beams. Thus, the beams of larger dimensions are not generated by dedicated reflectors or by feeds mismatched to the size of the reflectors, but by combining fine elementary beams. That offers a number of advantages compared to the prior art:

the antenna system is much simpler and more modular, because it can be composed only of identical feeds and of a small number of reflectors, also identical to one another;

the slopes of the patterns remain steep even for the beams of larger size, minimizing the interferences;

there is greater freedom in the choice of the form of the composite beams.

Figure 1:
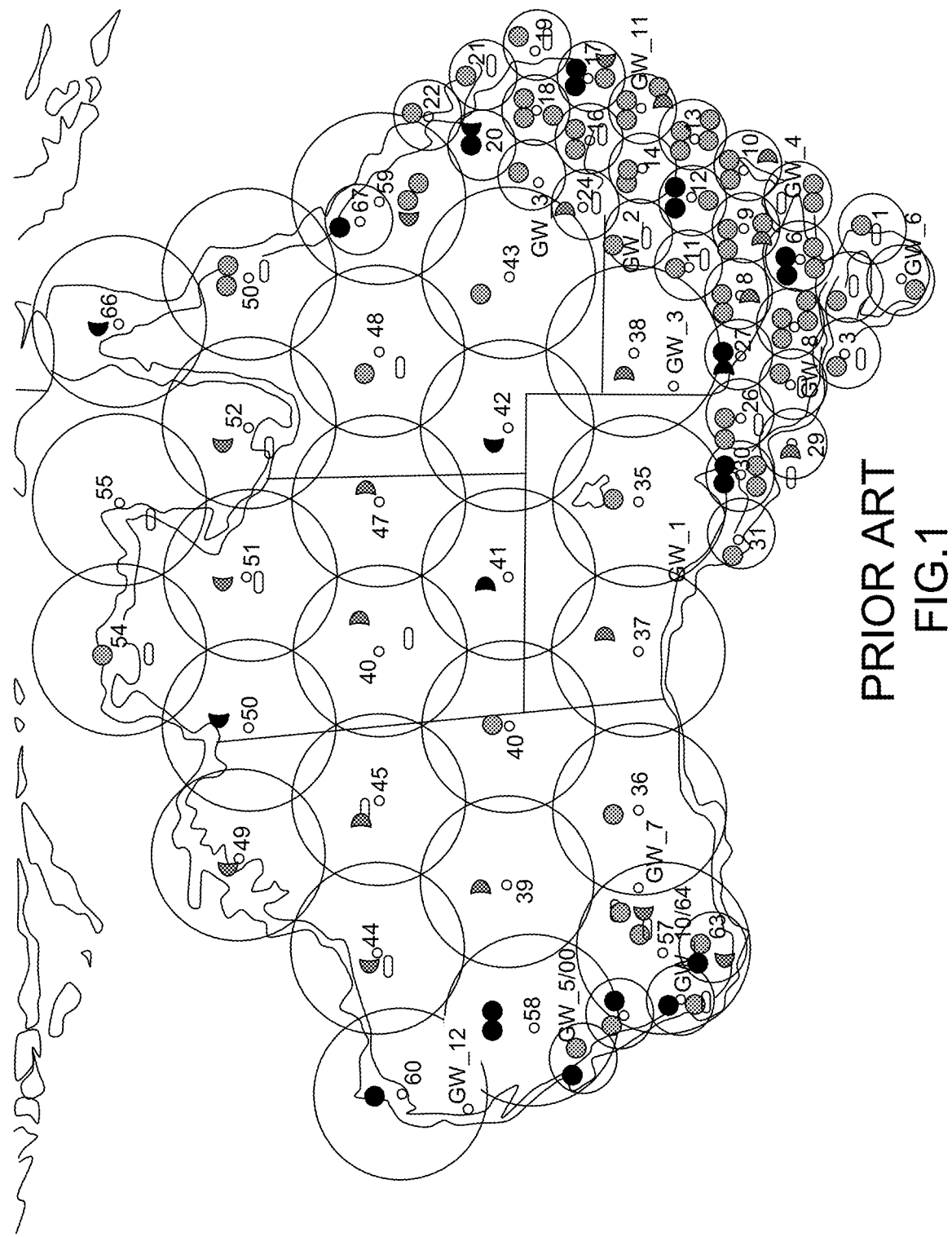
FIG. 1, described above, the multibeam coverage of a region having a greatly variable user density.
Figure 2A:
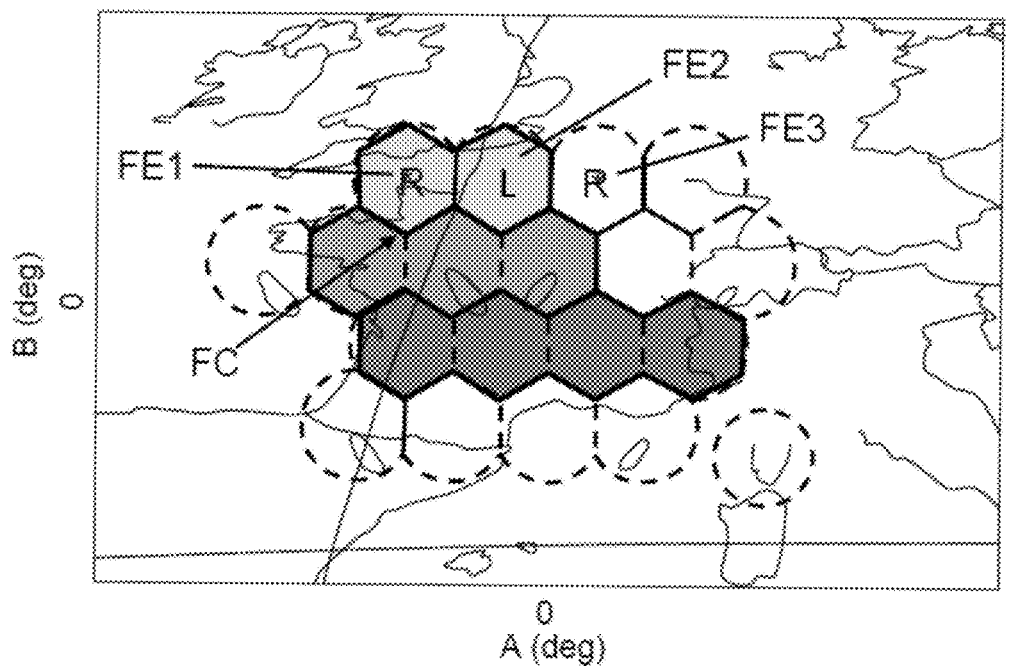
FIGS. 2A and 2B, an embodiment of a multibeam coverage.

FIG. 2A illustrates a multibeam coverage composed of elementary beams of identical size. The references FE1, FE2 and FE3 identify three of these elementary beams. Conventionally, to avoid interferences, adjacent elementary beams have different colours. In this particular case, more specifically, the footprints on the ground of the elementary beams are organized in rows. Adjacent elementary beams belonging to one and the same row have one and the same frequency band and orthogonal polarization states (a right circular polarization, "R" for "right", for FE1 and FE3; a left circular polarization, "L" for "left", for FE2). Elementary beams of different rows have unconnected frequency bands.

The elementary beams FE1 and FE2 are grouped together to form a wider composite beam FC, intended to cover a zone having a relatively low traffic density; the same data therefore pass through these two elementary beams. In this particular case, the elementary beams FE1, FE2 belong to one and the same row; they therefore have one and the same frequency band and differ only by their polarization. In these conditions, they can be generated by feed antennas linked to one and the same amplifier (power amplifier in transmission, low-noise amplifier in reception), the different polarization states being generated inside the antenna.

Obviously, it is possible to produce composite beams associating more than two adjacent elementary beams.

The elementary beam FE3, however, is used alone to ensure the high traffic density coverage.

Figure 2B:
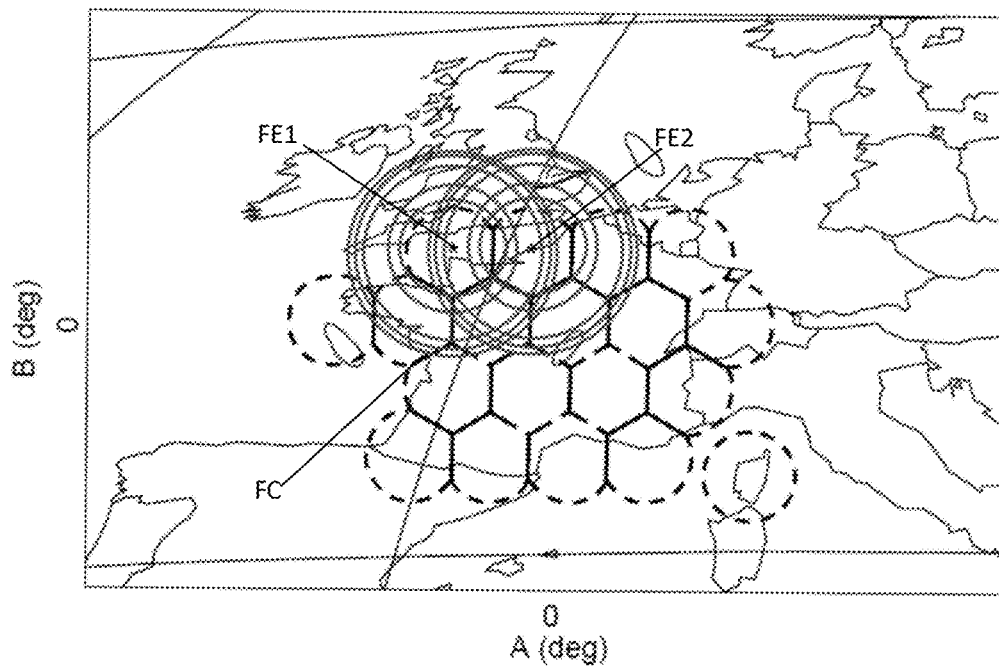

FIG. 2B shows curves of iso-intensity of the elementary beams FE1 and FE2. By virtue of the polarization diversity, these beams do not interfere even though they are adjacent; consequently, the intensity of the composite beam FC is given by the sum of the individual intensities of these elementary beams. It is therefore understood that the decrease in intensity on the edges of the footprint on the ground of the composite beam is as steep as in the case of the elementary beams taken in isolation. However, to subsequently reduce the interferences between different composite beams, it is preferable not to juxtapose regions covered by composite beams of very large dimensions with others covered by much smaller beams, but to exploit the versatility provided by the invention to produce coverages in which the size of the footprints on the ground of the composite beams varies gradually over the portion of the surface of the Earth affected by the coverage.

The composite beam has a solid angle that is a multiple of a number n of elementary beams. Given the division, the directivity is reduced by a factor $10 \cdot \log(n)$ in dB. When n is too high, the variation of directivity between an elementary beam and a composite beam can be significant and generate a variation of the signal ratio C of the composite beam that is proportional to n and therefore a reduction of the level of C/I, I being the interfering signals with the same frequency and polarization, originating from uncoupled elementary beams.

The elementary beams adjacent to a large composite beam can thus potentially degrade the signal-to-noise ratio (C/I) of the composite beam. To avoid the degradation of the signal-to-noise ratio, it can be advantageous to couple a limited number of elementary beams in a composite beam, in immediate proximity to elementary beams external to the composite beam. For example, a composite beam composed of two elementary beams can be adjacent to an elementary beam. By progressively varying the sizes of the footprints on the ground of the composite beams, the abrupt signal transitions in the signal-to-noise ratio are thus avoided.

Hitherto, the only case to have been considered is the one in which data cross at the same time through all the elementary beams of one and the same composite beam, these elementary beams sharing the frequency and power resources assigned to the composite beam. As a variant, it is possible to activate in turn the various elementary beams of one and the same composite beam, by means of a switch arranged in the payload of the satellite. Thus, each elementary beam uses—but only for a fraction of time—all of the available resources.

Figure 3:
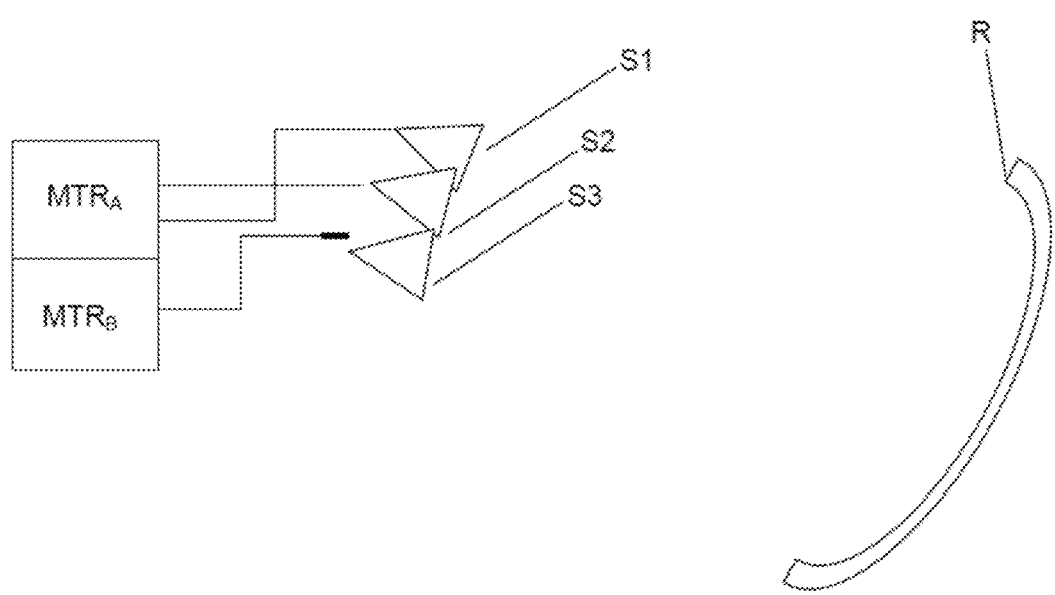
FIG. 3, a telecommunications payload according to an embodiment of the invention.

FIG. 3 illustrates, very schematically, the structure of a telecommunications payload, embedded on a satellite, allowing for the production of a multibeam coverage as described above. Such a payload, given purely as a nonlimiting example, comprises:

two transmission or reception modules—$MTR_A$ and $MTR_B$—to generate the signals that have to be transmitted via respective composite beams (in transmission) or to acquire the signals received by these beams (in reception). Each transmission or reception module comprises at least one power and/or low-noise amplifier.

Three feed antennas S1-S3 (electromagnetic horns) intended to each generate a respective elementary beam.

A reflector R cooperating with the feed antennas to generate said beams.

In reality, an antenna system according to the invention typically comprises several reflectors and a much higher number of feed antennas.

The module $MTR_A$ is linked to two feed antennas S1, S2 to produce a coverage of the type of FIGS. 2A, 2B. Although not apparent in the figure, the feed antennas S1 and S2 are adapted to transmit (or receive) according to orthogonal polarizations.

The module $MTR_B$ is linked to a single feed antenna, S3, to produce a fine "composite" beam, composed of a single elementary beam.

In the case where a large number of adjacent fine beams has to be created, an array comprising a large number of elementary feeds has to be produced. The elementary feeds can then be associated in several groups according to one or two directions of the focal plane of the reflector; the expression MFB (multiple feed per beam) architecture then applies. Compared to a solution not associating the elementary feeds, an identical coverage can be obtained with two times fewer antennas, even just one, by virtue of the interleaving of the elementary feeds. The person skilled in the art can find, in the document EP2688138, the information necessary to the re-use of the elementary feeds in one of the two dimensions of the plane. He or she can also find, in the document EP2688142, the information necessary to the re-use of the elementary feeds in the two dimensions of the plane.

It will be noted that the antenna system of the payload represented in FIG. 3 comprises only feed antennas that are identical to one another, cooperating with a single reflector (or identical reflectors). It thus makes it possible, in multibeam configuration, to have a diversity of sizes of beams with an initially regular array designed to form only a single beam size. It is therefore a structure that is simpler and more modular than that of a conventional multibeam antenna system, comprising feed antennas and/or reflectors of differing sizes.

The invention claimed is:

1. A method for multibeam coverage of a region of the surface of the Earth, the method comprising:
    a generation, by a telecommunications payload embedded on a satellite, of a plurality of radio frequency beams, called elementary beams;
    a formation of a plurality of radio frequency beams, called composite beams, exhibiting footprints on the ground of different sizes, each said composite beam being obtained by combining at least two elementary beams, all the elementary beams of the composite beams exhibiting footprints on the ground of identical size, the footprints on the ground of said adjacent composite beams having sizes that progressively vary across said a region of the surface of the Earth; and
    a transmission or the reception of data through said composite beams, the data being transmitted or received through all the elementary beams forming one and the same composite beam;
    wherein at least one of said composite beams is formed by combining a plurality of elementary beams having one and the same frequency band and two mutually orthogonal polarization states.

2. The method according to claim 1, wherein at least one said composite beam is formed by a grouping of a plurality of elementary beams whose footprints on the ground are adjacent.

3. The method according to claim 1, wherein all the elementary beams forming one and the same composite beam are generated at the same time.

4. The method according to claim 1, wherein all the elementary beams forming one and the same composite beam are generated in turn.

5. A satellite telecommunications payload, comprising:
    a plurality of feed antennas;
    at least one reflector arranged to cooperate with said feed antennas so as to generate a radio frequency beam, called elementary beam, for each said feed antenna; and
    a plurality of transmission modules configured to transmit respective data in a form of radio frequency signals;
    wherein:
        each said feed antenna belongs to a grouping of feed antennas, at least some of said groupings comprising a plurality of feed antennas;
        each said transmission module is linked to all the feed antennas belonging to one and the same grouping, such that the elementary beams generated by the feed antennas of one and the same grouping form a composite beam; and
        all the elementary beams of the composite beams exhibiting footprints on the ground of identical size;
        said groupings of feed antennas being configured such that a plurality of said composite beams exhibit footprints on the ground of different sizes, such that the footprints on the ground of adjacent composite beams have sizes that progressively vary across a region of the surface of the Earth; and
        elementary antennas of at least one said grouping are configured to generate elementary beams having one and the same frequency band and two mutually orthogonal polarization states.

6. The telecommunications payload according to claim 5, wherein the elementary antennas of at least one said grouping are configured to generate elementary beams whose footprints on the ground are adjacent.

7. The telecommunications payload according to claim 5, wherein at least one said transmission or reception module is equipped with a switch configured to link said module to the corresponding elementary antennas in turn.

8. A satellite telecommunications payload, comprising:
a plurality of feed antennas;
at least one reflector arranged to cooperate with said feed antennas so as to generate a radio frequency beam, called elementary beam, for each said feed antenna; and
a plurality of reception modules configured to receive respective data in a form of radio frequency signals;
wherein:
 each said feed antenna belongs to a grouping of feed antennas, at least some of said groupings comprising a plurality of feed antennas;
 each said reception module is linked to all the feed antennas belonging to one and the same grouping, such that the elementary beams generated by the feed antennas of one and the same grouping form a composite beam; and
 elementary antennas of at least one said grouping are configured to generate elementary beams of different colours, a colour being defined by a frequency band and a polarization state;
all the elementary beams of the composite beams exhibiting footprints on the ground of identical size;
 said groupings of feed antennas being configured such that a plurality of said composite beams exhibit footprints on the ground of different sizes, such that the footprints on the ground of adjacent composite beams have sizes that progressively vary across a region of the surface of the Earth; and
 the elementary antennas of at least one said grouping are configured to generate elementary beams having one and the same frequency band and two mutually orthogonal polarization states.

* * * * *

UNITED STATES PATENT AND TRADEMARK OFFICE
CERTIFICATE OF CORRECTION

PATENT NO.        : 11,522,605 B2
APPLICATION NO.   : 16/226514
DATED             : December 6, 2022
INVENTOR(S)       : Pierre Bosshard et al.

It is certified that error appears in the above-identified patent and that said Letters Patent is hereby corrected as shown below:

In the Claims

In Claim 1, Column 6, Line 13, "on the ground of said adjacent composite" should be -- on the ground of adjacent composite --.

In Claim 1, Column 6, Line 14, "vary across said a region of the surface" should be -- vary across a region of the surface --.

In Claim 1, Column 6, Line 16, "a transmission or the reception of data" should be -- a transmission or reception of data --.

Signed and Sealed this
Fourteenth Day of February, 2023

Katherine Kelly Vidal
*Director of the United States Patent and Trademark Office*